Dec. 1, 1942.                R. B. COMINS                2,303,824
                           HOSE RESIZING TOOL
                          Filed Aug. 20, 1940
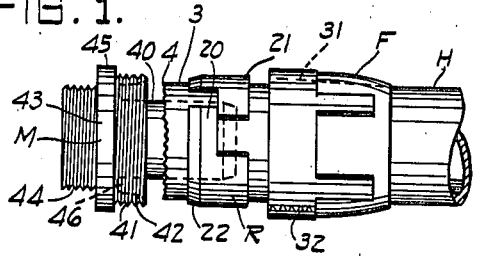
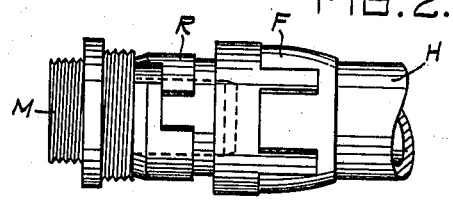
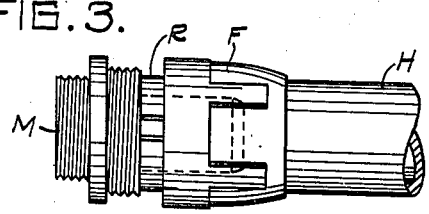
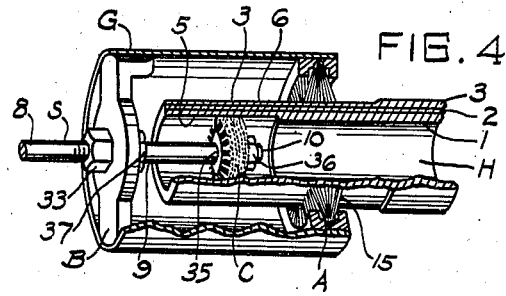
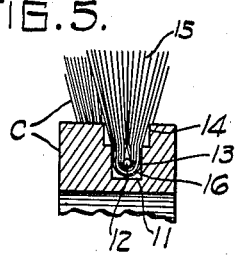
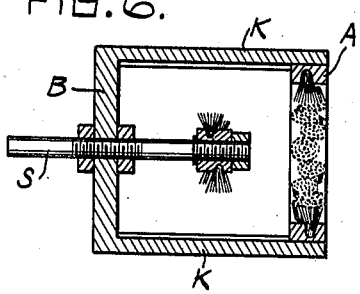
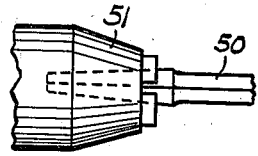
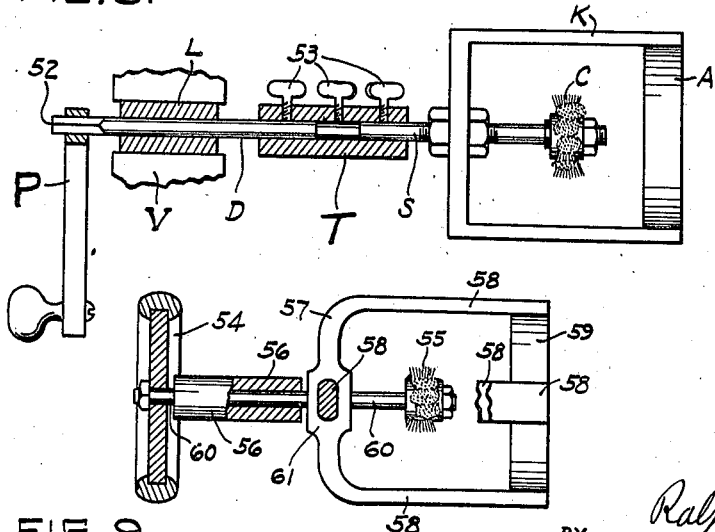

Patented Dec. 1, 1942

2,303,824

UNITED STATES PATENT OFFICE 2,303,824

HOSE RESIZING TOOL

Ralph B. Comins, Lowell, Mass.

Application August 20, 1940, Serial No. 353,394

7 Claims. (Cl. 29—76)

This invention relates to tools for repairing tubular rubber hose. It is particularly useful in connection with the delivery hose used for delivering fuel or range oil into tanks or into other containers.

Such hose is usually from one to two inches in diameter and is made up of an inside layer of rubber and an outside layer of rubber with fabric between. Such a hose may be one hundred feet or more in length and wear comes mostly at the nozzle end. When the hose breaks or a hole forms within a few feet of the nozzle or in fact at any other point, instead of throwing away the entire hose, it is customary to repair the break if possible by means of a coupling of one of several well known types.

A hose coupling includes a female member which fits outside the hose and a male member which fits inside the end of the hose where the repair is to be made. This end of the hose is usually cut off square and is usually treated with shellac or some similar material to hold the fiber together so that the male member can go inside and so that the tubular shank part of the female member can slip over the end.

However, some liquids like fuel oil and range oil cause the rubber on the inside and also on the outside to swell so much that the male and female members cannot be put in place until and unless some of the rubber on the inside is cut away to make a larger hole and some of the rubber on the outside is removed to allow the female member to fit over it. If the male member is driven in without sizing the hole, the rubber bunches up and plugs up the hose. It is also very difficult to slip the female or screw coupling member over the outside of the hose because the outside has also swollen unless the inside and outside of the hose have both been restored to the desired diameter and circumference so that the coupling members can slip into place easily. It is found that cutting with a sharp knife is slow and difficult and the result does not make perfect cylinders. The same is true if a file or similar device is used for scraping or grinding the outside or the inside.

As it is impossible to revolve the whole length of the hose, the only way to make true concentric cylinders on the inside and on the outside is by some sort of revolving tool.

I have found that cutting blades are highly objectionable because they catch in the rubber and cut slices making the result uneven while an emery wheel or other grinding device must be driven at a terrific speed and by a great power and moreover it is so rigid that it is very difficult to introduce it into the inside of a hose and even if introduced, it has a tendency to rip slices of the rubber out and to jam up.

I have discovered that a tool made with an inside convex wire brush, particularly of a certainly kind, and an outside concave wire brush which extends around the entire hose, when driven at a reasonable speed by reasonable power in any ordinary drill chuck, will scuff or scrape the material evenly on the inside and on the outside very quickly at about the same time and without ripping or tearing the rubber and without clogging.

My tool, therefore, includes a shank which carries an inside convex wire brush and an outside concave wire brush, the inside brush preferably being back of the outside brush so that the end of the hose can be pushed inside the outside brush and will then go outside of the inside brush whereby the inside and outside surfaces will be scuffed down so as to form two perfect concentric cylinders, the inside cylinder being shorter than the outside to conform to the requirements of the coupling.

The hose may be any length and may be cut anywhere and my tool may be operated by power or by hand.

In the drawing

Figs. 1, 2 and 3 show three stages of the process of coupling a hose of the type with which my tool is to be used.

Fig. 4 is an isometric view, partly broken away, showing the tool in a hose during the process of scuffing or scraping the inside and also the outside.

Fig. 5 is a sectional detail of the wire brush tufts.

Fig. 6 is a section on a vertical plane of a modification of the tool.

Fig. 7 is a detail showing a modification of the tool shank held by a bit stock.

Fig. 8 is an elevation of the tool shown in Fig. 6 showing how it can be held in a vise in a removable bearing and with detachable connecting means to a crank handle.

Fig. 9 is an elevation partly in section of a simplified modification of the tool with a bearing by which it can be held in a vise or in the hand.

In the drawing H represents a hose of the usual oil conveyer type made up of an inside layer 1 of rubber, a middle layer 2 of fabric and an outside layer 3 of rubber. 4 represents the end left after the broken section which is to be repaired has been cut off. One type of coupling by which the repair is to be made is shown in Figs. 1, 2 and 3.

M is what I will call the male part which is made of metal and has the tubular projection 40 which extends inwardly from the body 45 into the inside of the hose. Concentric with the part 40 is the threaded part 41 which with the part 40 forms an annular recess 46 to receive the end 4 of a hose. The threads of 41 are on the outside and the inside is bevelled at 42, to engage a similar bevel 22 on a split ring R which overlaps at 20 and has another bevelled part 21 opposite from 22. The male part M at 43 is preferably formed as a hexagon or of any other shape to receive a wrench and is also threaded at 44 to engage a nozzle or another coupling. The female part F has an inside bevel 31 and threads 32 which engage the outside threads 41 of the male part M.

The manner of assembling the coupling members on a hose is shown in Fig. 1 where the female part F is first slipped over the outside of the hose; Fig. 2 when the split ring R is slipped over the hose; and in Fig. 3 where the male member 40 is inserted inside so that end 4 enters recess 46. The male and female members are screwed together compressing ring R and making a tight joint.

It is necessary that the outside 3 of a hose H should be scuffed down as shown at 6 to permit the female part F to go over it and that the inside 1 should be scuffed outwardly at 5 to permit the male part 40 to go into it.

For the purpose of accomplishing this result, I provide a shank S, one end 8 of which is so made that it can be held in any ordinary drill chuck and the other end of which 10 is threaded up to a shoulder 35 against which the convex brush C rests, being held in place by a nut 36.

The intermediate part 9 of shank S, as shown, is threaded to receive the nuts 33 and 37 which adjustably hold the cross bar B in any desired position.

This cross bar B carries supporting means G, shown as a cylinder in Figs. 4, 8, and 6, which extends beyond brush C so as to hold on its inner side a concave annular brush A.

Each of these brushes A and C is made of bunches 15, 15 of stiff wire spaced apart so that they will not plug up. Each brush body 16 preferably has a series of brush holes such as 13, preferably countersunk at 14 on the outside so that each bunch of wires 15 can spread out, and each is provided on the inside with an annular channel 11 for a holding wire 12 which passes through the loop at the inside of each bunch of wires 15 which are pulled in through the holes 14 and 13.

In Fig. 6 the construction is the same except that the concave annular brush A instead of being held by a cylinder G is held by two arms K, K, which are attached to cross bar B.

As shown in Fig. 7, the end 50 of the shank at which my tool is held while being revolved can be formed to fit into a bit stock 51 or other hand revolving tool, the tool being moved instead of the hose being moved to the tool, the tool and bit stock being turned by hand.

As shown in Fig. 8, a stub shaft D with a squared end 52 for a removable crank handle P can be passed through a tube L, held in a vise V, which serves as a bearing and stub shaft D can be connected to shank S by a sleeve T and set screws 53, 53. This makes a hand power substitute for the chuck of a power machine.

As shown in Fig. 9, a one piece shank 60 with a wheel 54 at one end as a turning means and a convex wire brush 55 at the other end can be revoluble in a tubular bearing 56 and can carry a spider shaped support 57 with a hub 61 and four legs 58, 58, 58, 58 which support a concave wire brush 59.

Bearing 56 with the whole outfit can be held in the hand and brought to the hose or it can be held in a vise and the hose brought to the tool.

I claim:

1. In a tool for scuffing, scraping, and sizing flexible rubber hose; the combination of a shank adapted to be carried at one end by a power tool chuck and having nut threads positioned medially of its ends; a convex brush carried by the other end of the shank; a cross bar carried medially by the shank and adjustable on the threads; a concave annular brush of greater size than the convex brush; and means carried by the cross bar to support the concave annular brush beyond the convex brush, both brushes being formed of projecting bunches of radial wires arranged with spaced intervals.

2. In a tool for sizing flexible rubber hose; the combination of a shank adapted to be carried at one end by a power tool chuck; a convex brush carried by the other end of the shank; a cross bar carried medially by the shank; a concave annular brush of greater size than the convex brush; and means carried by the cross bar to support the concave annular brush beyond the convex brush both brushes being formed of projection bunches of radial wires arranged with spaced intervals.

3. In a tool for sizing flexible rubber hose; the combination of a shank adapted to be carried at one end by a power tool chuck; with a convex wire brush carried by the other end of the shank; a cross bar carried medially by the shank; a concave annular wire brush of greater size than the convex brush; and means carried by the cross bar to support the concave annular brush beyond the convex brush.

4. In a tool for sizing tubular hose; the combination of a shank adapted to be carried at one end; with a convex wire brush carried by the other end of the shank; a concave annular wire brush of greater size than the convex brush; and means carried by the shank to support the concave annular brush beyond the convex brush.

5. In a tool for sizing tubular hose; the combination of a shank adapted to be turned; with a convex wire brush carried by one end of the shank; a concave annular wire brush of greater size than the convex brush; and means carried by the shank to support the concave annular brush beyond the convex brush.

6. In a tool for sizing tubular hose; the combination of a shank adapted to be turned; with a convex wire brush carried by one end of the shank; turning means at the other end of the shank; a concave annular wire brush of greater size than the convex brush; means carried by the shank to support the concave annular brush beyond the convex brush; and a bearing in which the shank can be turned between the turning means and the last named means.

7. In a tool for sizing flexible rubber hose; the combination of a cylindrical metal shank having at one end means by which it can be turned; with a convex wire brush carried by the other end of the shank; a concave annular wire brush of greater size than the convex brush also carried by the shank beyond the convex brush; and tubular bearing means to hold the shank while it is being rotated.

RALPH B. COMINS.